United States Patent [19]

Rahn

[11] Patent Number: 4,983,347
[45] Date of Patent: Jan. 8, 1991

[54] METHOD OF PRODUCING AN INTERNALLY SMOOTH, EXTERNALLY RIBBED TUBE FROM EXTRUDABLE PLASTIC AND APPARATUS FOR CARRYING OUT THE METHOD

[75] Inventor: Horst Rahn, Hassfurt, Fed. Rep. of Germany

[73] Assignee: UNICOR GmbH Rahn Plastmaschinen, Hassfurt, Fed. Rep. of Germany

[21] Appl. No.: 462,941

[22] Filed: Jan. 4, 1990

Related U.S. Application Data

[63] Continuation of Ser. No. 266,051, Nov. 2, 1988, abandoned.

[30] Foreign Application Priority Data

Oct. 21, 1988 [DE] Fed. Rep. of Germany ....... 3737588

[51] Int. Cl.$^5$ ................. B29C 47/76; B29C 47/88
[52] U.S. Cl. ................. 264/508; 264/209.4; 264/209.8; 425/326.1; 425/393; 425/396; 425/812
[58] Field of Search ............ 264/508, 505, 515, 566, 264/173, 209.8, 209.4; 425/393, 396, 326.1, 336, 532, 388.1, 133.1, 812

[56] References Cited

U.S. PATENT DOCUMENTS

| | | |
|---|---|---|
| 3,280,430 | 10/1966 | Antrobus .................... 425/532 |
| 3,298,064 | 1/1967 | Taga ......................... 264/209.8 |
| 3,743,457 | 7/1973 | Cini ......................... 425/133.1 |
| 3,891,007 | 6/1975 | Kleykamp ................... 425/396 |
| 3,994,644 | 11/1976 | Hegler et al. ............... 425/113 |
| 3,998,579 | 12/1976 | Gustav et al. ............... 425/396 |
| 4,171,195 | 10/1979 | Klein et al. ................ 425/466 |
| 4,365,948 | 12/1981 | Chaplain .................... 264/508 |
| 4,402,898 | 9/1983 | Rosenbaum .................. 264/209.8 |
| 4,710,337 | 12/1987 | Nordström ................... 264/508 |
| 4,721,594 | 1/1988 | Jarvenkyla .................. 264/508 |

FOREIGN PATENT DOCUMENTS

| | | |
|---|---|---|
| 142482 | 5/1985 | European Pat. Off. . |
| 2362444 | 6/1975 | Fed. Rep. of Germany ...... 2450171/041975DEX |
| 2709395 | 5/1979 | Fed. Rep. of Germany . |
| 70822 | 7/1986 | Finland ....................... 47/00 |

Primary Examiner—Jeffery Thurlow
Attorney, Agent, or Firm—Kerkam, Stowell, Kondracki & Clarke

[57] ABSTRACT

In the production of plastic tubes or pipes which are internally smooth-walled but have peripheral ribs externally, in particular from extrudable, more especially thermoplastic plastic such as PVC, a good filling of the cavities in the moving mold which are provided to form the ribs, is achieved in that said cavities are filled with the molten plastic first at a distance from the separating plane of the moving mold and last in the region of said separating plane.

14 Claims, 4 Drawing Sheets

METHOD OF PRODUCING AN INTERNALLY SMOOTH, EXTERNALLY RIBBED TUBE FROM EXTRUDABLE PLASTIC AND APPARATUS FOR CARRYING OUT THE METHOD

This is a continuation of Application Ser. No. 266,051, filed Nov. 2, 1988 now abandoned.

BACKGROUND OF THE INVENTION

1. Field of the Invention

The invention relates to a method of producing from extrudable plastic an internally smooth tube having externally circumferentially extending ribs, the molten or melt plastic being extruded from a stationary nozzle into the interior of a moving mold passage having the desired outer form of the tube and being pressed against the inner wall of the mold passage, the smooth inner wall of said tube being formed by means of a mandrel provided in the mold passage. The extrudable material will usually be a thermoplast, such as in particular PVC or PE. It may, for example, also be crosslinkable PE.

2. Description of the Prior Art

Methods of the type outlined above are widely known. For example German patent specification No. 2,450,171 describes such a method in which the extrusion passage opens axially directed into the interior of a moving mold passage. At a considerable distance from said opening the nozzle core carries the piston, the extruder-side end wall of the piston being formed as slightly rising cone. The melt then flows against said cone, is expelled thereon outwardly and should press itself into the ribs-forming depressions in the inner wall of the moving hollow mold. Since the extrusion pressure is not directed outwardly (the melt flows freely between nozzle and cone) the force pressing the melt into the rib cavities is obtained only by the entraining effect of the moving mold on the viscous-elastic melt pressed between the moving mold and the mandrel. This not only leads to a relatively high pressure over a long distance., a further disadvantage resides in that the melt tends to form shear surfaces along cylinder lines in the interior of the tube. The main disadvantage of this method is, however, that it is extremely difficult to achieve a satisfactory formation of the ribs For the latter an extremely accurate coordination is necessary between the extrusion velocity, the withdrawal velocity and the extrusion temperature. Also, the melt must satisfy a great number of parameters.

According to another known method (German patent specification No. 2,709,395) a "melt tube" (a tube-shaped melt) emerges floatingly from the extrusion nozzle and is pulled onto a mandrel held spaced apart from the nozzle by an extension of the nozzle core. There, the flexible melt tube, which is widened over the likewise conical extruder-side end wall of the core, comes into the "gripping region" of the moving mold, is gripped by the latter, so that the deformable melt is pressed to a greater or lesser extent into the outer grooves of the mold passage under the influence of the entraining force. In this case the problems which are encountered are substantially the same as those in the method first described.

A further method of the type outlined is known from European patent specification No. 0 142 482. In this method a flexible tube or hose is also extruded in the axial direction and is inflated by means of compressed air in the interior of the mold passage in order to be pressed into the depressions of the mold forming the ribs. Considerable problems are encountered here in achieving satisfactory filling of the rib cavities simply by the compressed air. The nozzle core carries a second extrusion head from which a further plastic tube or hose is extruded which is also inflated by compressed air and pressed from the inside against the more or less smooth wall of the already produced ribbed tube. The core of said second extrusion head in turn carries in spaced relationship a piston which is intended to smooth the inner wall of the tube thus produced. In this method the problem of satisfactory formation of the ribs is present to a greater extent.

Finally, German Auslegeschrift No. 2,362,444 discloses a method in which in the interior of the moving mold a slightly conically outwardly directed tubular plastic melt stream is extruded into the annular space between the nozzle end wall, the mandrel and the mold passage. In this case extrusion is thus directed into the space to be filled. In this method as well, particularly when it is to be carried out with reasonably acceptable operating speeds, the formation of a satisfactory rib is difficult. Furthermore, with this method a pulsating backpressure occurs due to the different material requirement in the ribless region on the one hand and the ribbed region on the other and this back-pressure is also disadvantageous. Finally, in the known method the inner surface of the tube is very often irregular.

SUMMARY OF THE INVENTION

The invention is thus based on the problem of providing a method of the type outlined above which does not have the disadvantages of the known methods, i.e. is distinguished in that even at reasonable operating speeds satisfactory filling of the cavities forming the ribs is ensured and furthermore other disadvantages like the inhomogeneity of the tube structure mentioned above, the high internal pressure over a long section of the mold passage and the dependence of the correct filling of the rib cavities on the viscosity of the melt are largely eliminated.

The invention solves this problem by the improvement that in at least a predetermined portion of the periphery of the tube the filling of the rib-forming depressions of the mold passage with melt is delayed.

In this manner, not every rib cavity is abruptly filled with melt, which would make it difficult for the air disposed in the rib to escape and therefore might lead to air inclusions. Due to the fact that in predetermined peripheral regions the melt can enter the cavity forming the rib to a greater extent than in the other regions, the melt firstly and rapidly fills the cavities forming the ribs in said regions pushing the air along in front of it in the peripheral direction. It must, of course, be ensured that in said regions where the melt last enters the residual air can escape adequately. This can, for example, be done in that corresponding air-exit bores are provided there or alternatively the entire mold can be made from adequately porous material. In the latter case as well the method according to the invention has proved to be far easier to handle than the known methods with regard to satisfactory rib formation.

Preferably filling of the regions close to the joints of the mold passage is delayed. The melt flowing into the regions of each rib cavity remote from the joints can then push the air along in front of it up to the joints and out through the latter.

According to a preferred further development of the invention the plastic stream is expelled from the nozzle substantially radially outwardly against the inner wall of the mold passage. This has the essential advantage that from the beginning a substantial flow direction directed to filling the rib cavities in the moving mold is present. A flowing away of the melt against the moving direction of the mold passage between the nozzle and the smallest internal width of the mold passage does not occur if the extrusion speed, i.e. the melt throughput per unit time, and the travelling speed of the mold passage are matched and furthermore the gap between the outer periphery and the peripheral surface of the jacket of the nozzle projecting into the mold passage is kept small enough, for example on the order of magnitude or 0.1 or 0.2 mm.

The invention also relates to an apparatus for carrying out said method comprising a shaping tool of circulating endless sequences of mold parts forming a moving mold passage having the desired outer form of the tube, an extruder, an extrusion nozzle having a tubular extrusion passage which opens into the interior of the mold passage, and a mandrel arranged in the mold passage downstream of the nozzle opening and forming the inner surface of the tube.

The shaping tool consists as a rule of two endless circulating sequences of mold halves which complement each other along a straight working section to form a moving or migrating mold passage and generally are provided with appropriate cooling means. The shaping mandrel is also provided with cooling means through which coolant can circulate therein. Such constructions are, however, generally known and need not be explained in detail within the scope of the present invention.

According to one embodiment of the invention the apparatus comprises an extrusion passage which is constricted in each peripheral region having delayed exit of the melt. As a result, in the regions of delayed exit the melt emerges more slowly than in the other peripheral regions and the aforementioned effect is achieved, i.e. that in the desired regions the melt emerges later than in the regions in which the melt is to first fill the rib cavities and then later pushes the air peripherally in front of it.

According to a preferred embodiment of this realization of this aspect of the apparatus of the invention, the constriction is provided in the mouth of the extrusion passage. The constriction can fundamentally, of course, also be provided just in front of the mouth but it is preferred and also simplest for it to lie directly in the mouth.

It is self-evident that with respect to the regions of normal exit-cross-section of the extrusion passage the constriction takes place preferably continuously and gradually with slow transition.

In the simplest case, in the advantageous further development with radial-exit direction of the melt discussed below the constriction can be obtained in that the end wall of the mandrel facing the extruder is made higher by an appropriate amount in the regions in which a delayed exit is desired. It is equally possible with rotational-symmetrical formation of said mandrel end face to effect such an elevation by causing the extruder-remote end wall of the nozzle jacket to project to a correspondingly greater extent.

In certain apparatuses, for example according to German patent specification 2,450,171 or European patent specification No. 0 142 482, the delayed filling of the rib cavities can, for example, be achieved in that the extruder-side mandrel end wall is made higher in those regions in which the filling of the rib cavities is to begin by, for example, enlarging the conicity of the end wall there.

A particularly advantageous embodiment of the apparatus for carrying out the method according to the invention is, however, one in which the exit opening of the extrusion passage in the peripheral regions with delayed exit lies further from the extruder than in the remaining regions. This provides in the entire extrusion passage substantially identical flow conditions over the entire periphery. Differences do not occur until directly in the exit region Preferably, in this embodiment the exit opening of the nozzle passage in the cylinder development extends in undulated form.

The construction is simplest here when the exit opening of the nozzle passage in the cylinder development has the form of a single wave. This means that, seen in the peripheral direction, the distance of the exit opening of the nozzle passage from the extruder decreases over the peripheral angle up to a value of 180° and then likewise continuously and gradually returns to the original dimension.

The construction in which the exit opening of the extrusion passage lies in predetermined regions further remote from the extruder than in the other regions has the essential advantage that it considerably counteracts any pressure pulsations arising in the incoming melt when the distance of the exit opening of the extrusion passage from the extruder varies by more than the axial spacing apart of two ribs.

An embodiment is preferred in which the exit opening of the nozzle passage in the cylindrical development has the form of two waves. In this case the formation of the nozzle and thus also the flow is symmetrical with respect to two axial planes normal to each other.

As already mentioned above in the discussion of the inventive method, it is preferred that the amplitude regions of the undulation remote from the extruder each extend in the region of separating planes of the mold. This promotes the expulsion of the air through the mold gap by the melt penetrating the rib cavities.

From the point of view of the apparatus, it is preferred, but is not an essential condition of the invention, for the end wall of the Jacket of the nozzle and the end wall of the mandrel facing said wall to form a substantially radially outwardly-opening exit region of the nozzle passage, because this results in the flow direction of the emerging melt being directed immediately into the mold cavities forming the ribs of the tube.

Preferably, the nozzle passage here is made extending in trumpet form towards the nozzle opening.

If it is desired to minimise also the pressure pulsations, then this can be done most exactly in that the distance from the portion of the extruder-side edge of the nozzle opening closest to the extruder to the portion of the edge thereof most remote from the extruder corresponds to one pitch or an integer multiple of one pitch of the ribs of the tube. The "pitch" of the rib arrangement meant here is the distance from a specific point of the profile of the rib arrangement in the longitudinal direction of the tube up to the beginning of the next identical point of the rib arrangement.

BRIEF DESCRIPTION OF THE DRAWINGS

The invention will be explained hereinafter in detail with the aid of preferred examples of embodiment with reference to the schematic drawings, wherein.

DESCRIPTION OF THE PREFERRED EMBODIMENT

Figures 1, 2:
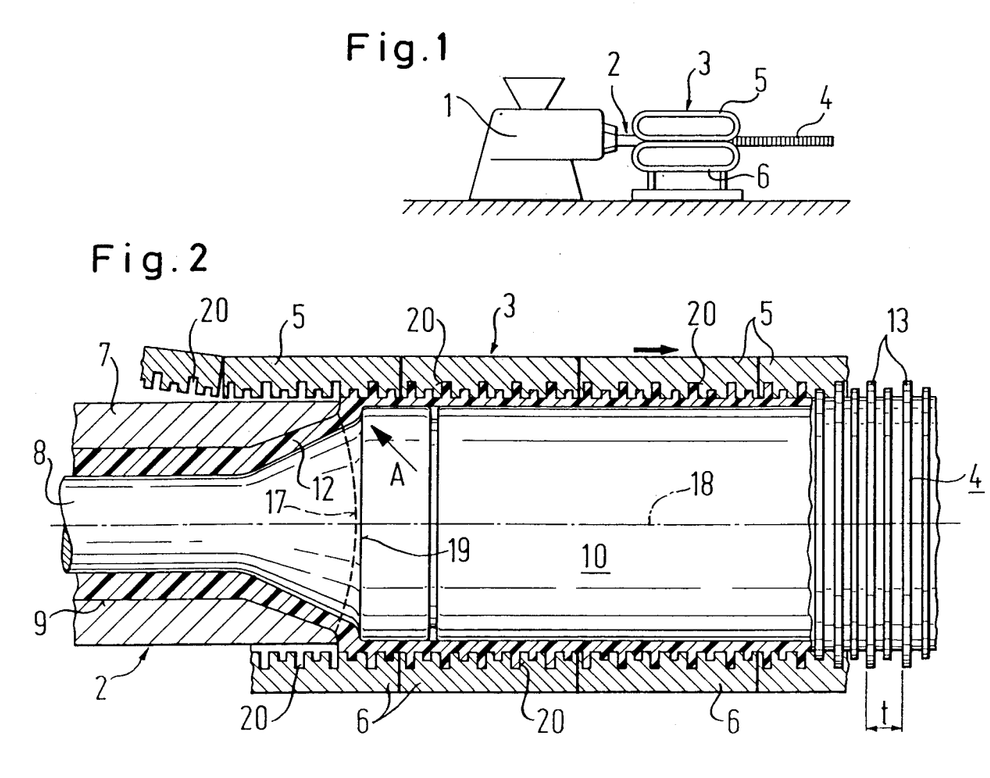
FIG. 1 is a general view of an apparatus according to the invention in side elevation.
FIG. 2 is an axial section through the region of the apparatus in which the extrusion nozzle opens into the moving mold passage with forming or shaping mandrel.

In the general drawing according to FIG. 1 there is shown an extruder i, the extrusion nozzle 2 of which projects into the mold cavity of a shaping tool or die 3, from which the finished ribbed tube 4 produced emerges on the right.

The extrusion die 3 consists in usual manner of two circulating sequences of mold-jaw halves 5 and 6 which run adjacent each other without spacing along a straight working section (in this case illustrated in alignment with the nozzle and the tube 4) and there form a moving or migrating mold passage the inner wall of which corresponds to the desired outer form of the ribbed tube or pipe.

Figure 5:
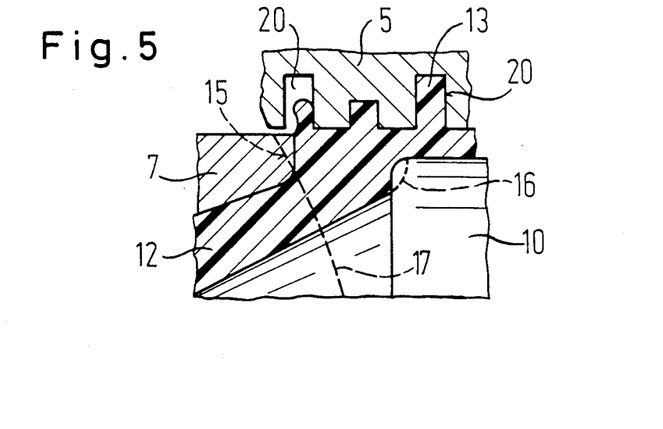
FIG. 5 shows to the same scale as FIG. 4 a modified embodiment of the region of the extrusion opening.

As apparent from FIG. 2 the nozzle 2 has a nozzle Jacket 7 which leaves free a tubular nozzle passage 9 between itself and the nozzle core 8, said passage 9 again widening conically outwardly just before or upstream of the mouth of the nozzle at point A. The nozzle core 8 bears at its conical widening internally-bordering the conical widening of the mold passage a forming or shaping mandrel 10 which forms the inner wall of the ribbed pipe to be produced and is provided in its interior with cooling means which are not illustrated and which are generally supplied through the core 8 with a cooling fluid. The mandrel 10 may be followed by further elements, such as further pistons, to maintain supporting air between the mandrel 10 and a further mandrel. In FIG. 5 the melt stream is denoted by 12 and merges in the region of the mandrel 10 continuously into the finished tube 4.

As best apparent from FIG. 2 the nozzle passage 9 widens in the form of a trumpet in front or upstream of the exit opening into the mold cavity between the nozzle Jacket 7, moving mold 3 and mandrel 10; the end thereof then extends substantially radially outwardly in a curve so that the melt stream emerges at this point at least approximately radially.

Figure 4:
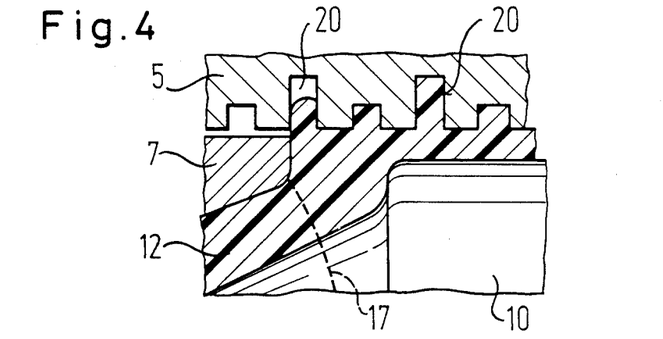
FIG. 4 shows the region A of FIG. 2 to a larger scale.

The exit opening need not be exactly radial as is, for example, shown in FIG. 4. Even with a strictly radial direction but only a short extent of the radial region over the configuration of FIG. 4, on emerging the flow will still have in the region thereof a certain component in the moving direction of the mold 3 away from the extruder. This axial velocity component of the melt stream can be further assisted in that the fundamentally radial exit region is given a certain inclination in the direction of the mold movements, as indicated in FIG. 5. If the ribs 13 of the plastic tube 4 to be produced are very high and narrow, the filling can be still further improved in that the radially directed exit region of the nozzle passage is even given, in contrast to FIG. 5, a component directed towards the extruder. In this case the wall regions of said region could extend as indicated in FIG. 5 with dashed line at 15 and 16. For, only such a path of the exit region of the melt passage in the nozzle will in fact impart a vertical discharge of the melt out of said nozzle.

As apparent from FIGS. 2, 4 and 5 in the example of embodiment shown there, the end wall 17 of the nozzle Jacket 7 near the mouth is not as hitherto usual rotational-symmetrical with respect to the axis 18 of the nozzle and of the mold passage. On the contrary, said end wall rises to the right from its two regions lying at the top and bottom in FIGS. 2, 4 and 5, i.e. towards the mandrel, gradually, continuously and slightly so that in the plane extending perpendicularly to the plane of the drawings through the axis 18 it has a somewhat greater distance from the extruder. As a result, in said regions the width of the exit gap is reduced to about two/thirds the width of the regions lying at the top and bottom in FIGS. 2 and 4 because the opposite end wall 19 of the mandrel 10 extends rotational-symmetrical with respect to the axis 18. Consequently, the extruder-side surface of the mandrel 10 is formed by rotation of the generatrix of said surface about the axis 18 shown in FIG. 2, 4 or 5.

Since due to the constriction of the extrusion opening in the two regions lying a maximum distance in front of and behind the plane of the drawings (see FIG. 2, 4 and 5) the melt emerges there more slowly than in the regions lying at the top and bottom in said Figures, the effect indicated in FIG. 2 occurs. The plastic entering the grooves 20 in the wall of the mold passage enters in FIGS. 2, 4 or 5 faster at the top or bottom than in the regions of the rib cavities 20 lying on the left and right in FIG. 3 in the separating plane 21 of the two mold halves. In the stage in which plastic melt has not yet penetrated into said regions melt has already penetrated into the upper and lower regions, as indicated roughly at 22 in FIG. 3, said melt now firstly fills the rib cavities at the top and bottom and displaces the air towards the separating joints 21 so that a satisfactory filling is ensured.

Figure 6:
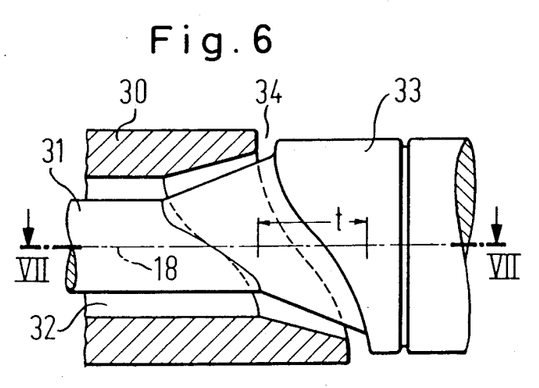
FIG. 6 shows a further embodiment of the invention, likewise in axial section, which in this case coincides with the section through the separation plane of the two halves of the moving hollow mold.
Figure 7:
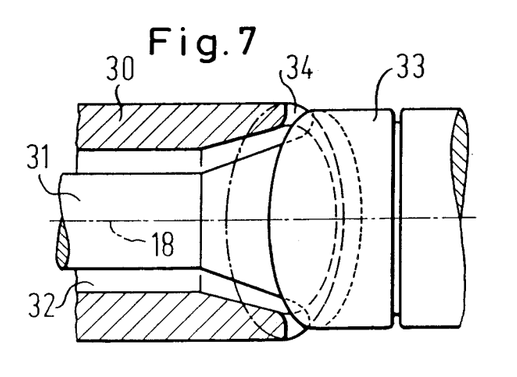
FIG. 7 is a view from above on the embodiment of FIG. 6 along the axial section VII—VII.

The embodiment shown in FIGS. 6 and 7 implements the principle of the invention in another manner. In this case the nozzle jacket 30 and the nozzle core 31 are shown, leaving between them the nozzle passage 32 which is cylindrical on the left and widens conically on the right. The nozzle core 31 carries on the right the mandrel 33 forming the inner wall of the tube. Here as well the exit region of the nozzle passage extends radially outwardly as apparent at 34 although this is not absolutely essential to the implementation of the invention.

As apparent from FIG. 6 and 7 the width of the nozzle exit opening is substantially constant over the entire periphery. However, over the periphery the nozzle exit opening varies its distance from the extruder on the left, namely by the amount t corresponding to one pitch of the ribs 13 of the tube 4 (FIG. 2). This means that from the uppermost point of the exit opening of the extrusion passage in FIG. 6 at 34 the distance of the exit opening of the extrusion passage from the extruder increases continuously over the periphery until it reaches the maximum value of one pitch at the bottom of FIG. 6 and then decreases again likewise continuously with further encircling of the periphery up to the uppermost point in FIG. 6. As a result the melt exits from the nozzle passage first in the uppermost point in FIG. 6 which in the embodiment according to FIG. 1 with die jaws circulating in a vertical plane lies in the horizontal plane between the two die jaw sequences 5 and 6 and with die Jaws 5 and 6 circulating in the horizontal plane lies at the top and furthermore lies in one of the two separating joints of the mold passage; the melt leaves the nozzle passage lastly at the lowermost point of the exit opening in FIG. 6 which in this case also lies in the mold separation plane.

Figure 3:
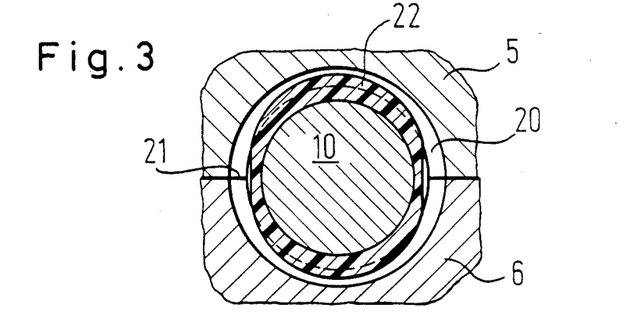
FIG. 3 illustrates schematically in a section normal to the extrusion direction the effect aimed at with the invention, namely a melt stream entering the rib cavities of the mold non-uniformly over the periphery.

Still considering FIG. 3, the result of this is that the plastic first enters the groove 20 in the region in which the reference line of the reference numeral 21 terminates and last enters opposite this region so that in this case as well satisfactory expulsion of the air is achieved.

It should also be noted that as apparent from FIGS. 6 and 7 to obtain as constant as possible an extension of the extrusion passage in front of the exit region, the walls of the extrusion passage 32 are defined in said region by inclined or oblique helix faces.

For clarity, in FIG. 7 the outer edge of the end wall of the nozzle jacket 30 lying above the plane of the drawings has been shown in dot-dash line.

Figure 8:
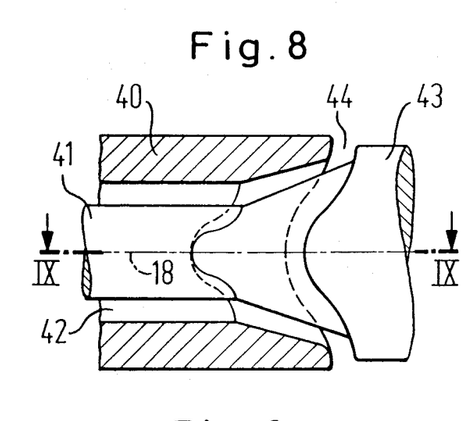
FIG. 8 shown an axial section, likewise lying in the separation plane of the two mold halves of the mold passage, of a further embodiment of the invention.
Figure 9:
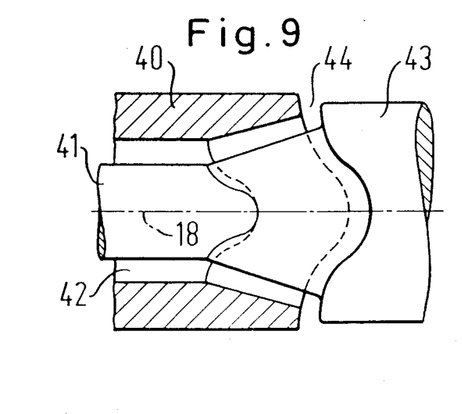
FIG. 9 is a section along IX—IX of FIG. 8.

In the embodiment according to FIGS. 8 and 9 likewise a nozzle jacket 40 is provided and defines together with a nozzle core 41 a nozzle or extrusion passage 42. The extrusion passage extends in this case as well at first cylindrically and then widens in the vicinity of the extrusion opening 44 conically outwardly. Here too, the nozzle core 41 carries on the right side a mandrel 44. The embodiment according to FIGS. 8 and 9 differs from that according to FIGS. 6 and 7 in that the likewise radially outwardly directed extrusion opening increases its distance from the extruder on the left side beyond the periphery from the two points of minimum distance, which lie in accordance with FIG. 8 in a normal plane through the axis 18 in front of and behind the drawing pane, in accordance with FIG. 8 both upwardly and downwardly by one pitch length to reach the largest distance in FIG. 8 at the top and bottom, said distance lying in FIG. 9 in a normal plane perpendicular to the drawing pane through the axis 18 in front of and behind the drawing plane.

Both in the embodiment according to FIGS. 6 and 7 and in that according to FIGS. 8 and 9 the distance of the extrusion opening 34 or 44 respectively from the extruder over the periphery follows substantially a sinusoidal curve.

In the embodiment of FIG. 8 the drawing plane of said FIG. 8 lies in the separating plane 21 of the mold halves 5 and 6 so that the plastic melt enters the rib cavities first at the greater possible distance from said separating planes and does not fill the latter completely until the region of the separation joints 21 is reached.

Figure 10:
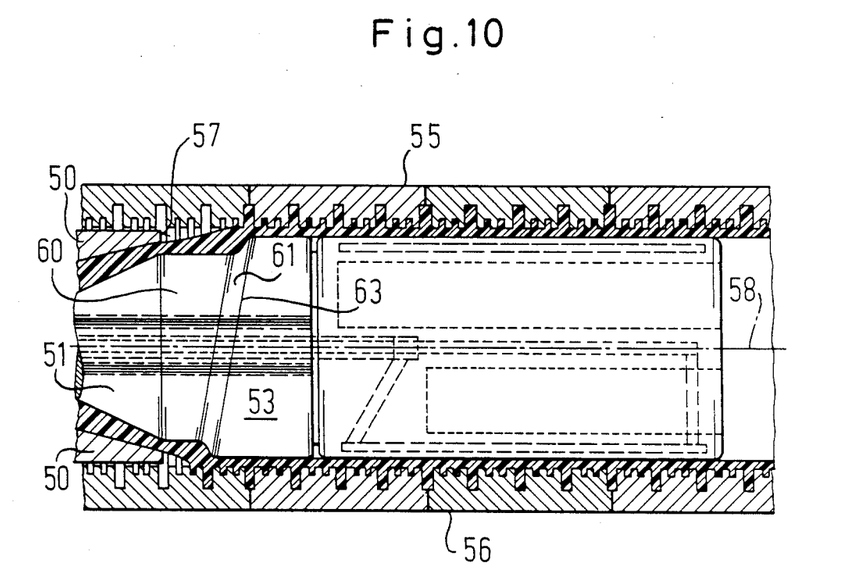
FIG. 10 shows a further embodiment in an illustration similar to FIG. 2.

The invention is not restricted to the possibilities described above referring to the Figures. The invention can, for example, also be used for embodiments in which the cylindrical or slightly conical exit region of the extrusion passage discharges a tube or hose which pushes itself onto the inclined rising extruder-end wall of the mandrel in order to be formed between the mandrel and the moving mold. Such constructions are known, for example, from German patent specification No. 2,450,171 or German patent specification No. 2,709,395. In these constructions the invention can be implemented in that the extruder-side end wall of the piston in the peripheral region of delayed filling has a greater distance from the nozzle opening than the remaining peripheral region. An embodiment of such a construction is shown in FIG. 10. On the left of said FIG. 10 the nozzle jacket 50 can be seen with the nozzle core 51 which merges into the mandrel 53. The shaping die is shown at 55 and 56 whilst the melt is drawn with thick and thin hatches.

In this construction the extrusion nozzle 50, 51 has an end wall 57 which extends in a plane normal to the axis 58 of the extrusion nozzle. As apparent from the drawing the nozzle core 51 first merges into a cylindrical extension 60 which at a distance from the nozzle end wall 57 carries the mandrel 53. In contrast to the prior art, in this construction the nozzle-side mandrel end wall 61 rising inclinedly from the cylindrical extension 60 up to the mandrel diameter is not rotational-symmetrical with respect to the nozzle axis 58. Whereas at the bottom of FIG. 10 compared with the previously described examples the extension 60 still has a relatively large distance from the nozzle end wall 57, said relatively large distance continuously increases in the peripheral direction to the opposite point which is at the top in FIG. 10 so that in FIG. 10 at the top the melt cannot flow into the region between the mandrel and shaping tool until a later location and is there compelled to fill the peripheral grooves forming the ribs. Accordingly, in the construction according to FIG. 10 the separating pane of the mold is likewise advantageously in the drawing plane.

In the construction according to FIG. 10 the cylindrical portion 60 and the end wall 61 may also be replaced by a relatively gently rising cone which then extends from the end wall 57 up to the nozzle-side edge 63 of the mandrel. Instead of a conical rise, a rise for example in the form of a spherical intermediate portion is possible, i.e. in which the increase from the core diameter at the nozzle exit to the mandrel diameter is more pronounced at the start and is least at the transition to the mandrel periphery. Alternatively, it is also possible to make the rise of the transition portion between nozzle exit and mandrel minor at the beginning and thereafter greater as shown in relatively extreme form in FIG. 10.

I claim:

1. A method for producing from extrudable plastic an internally smooth tube having externally circumferentially extending ribs comprising extruding a plastic melt from a stationary nozzle into the interior of a moving mold passage having circumferentially extending rib forming depressions which form the ribs of the tube, pressing the melt against the inner wall of the mold passage, forming the smooth tube inner wall by means of a mandrel provided in the mold passage, and delayed filing the depressions of the mold passage which form the ribs of the tube with the melt wherein the filling of at least one region extending over at least one separation joint of the mold passage is delayed.

2. A method according to claim 1, wherein the plastic flow from the nozzle is pressed substantially radially outwardly against the inner wall of the mold passage.

3. An apparatus for producing from extrudable plastic an internally smooth tube having externally circumferentially extending ribs, the apparatus comprising a pair of opposed shaping tools, each of said shaping tools including circulating, endless sequences of mold parts forming half of a moving mold passage having the desired outer form of the tube, an extruder, an extrusion zone having a tubular extrusion passage which opens into the interior of the half mold passages, and a mandrel positioned in the half mold passages and forming the inner surface of the tube, said extrusion passage being constricted in at least one peripheral region of delayed exit for the extrudable plastic, wherein said at least one constricted region extends over the separating plane of the mold parts.

4. An apparatus for producing from extrudable plastic an internally smooth tube having externally circumferentially extending ribs, the apparatus comprising a pair of opposed shaping tools, each of said shaping tools including circulating, endless sequences of mold parts forming half of a moving mold passage having the desired outer form of the tube, an extruder, an extrusion zone having a tubular extrusion passage which opens into the interior of the half mold passages, and a mandrel positioned in the half mold passages and forming the inner surface of the tube, said extrusion passage varying its distance from the extruder whereby the melt exits from the nozzle at different distances from the extruder such that the distance of the exit opening of the extrusion passage in the peripheral regions with delayed exit of the melt is more remote from the extruder than in the remaining regions, at least one portion of the said extrusion passage remote from the extruder extending over the separating plane of the mold parts.

5. An apparatus according to claim 3, wherein the constriction is provided in the mouth of the extrusion passage.

6. An apparatus according to claim 4, wherein the exit opening of the nozzle passage extends in undulations in a cylinder development (FIG. 6–9).

7. An apparatus according to claim 4, wherein the exit opening of the nozzle passage in a cylindrical development has the form of one single wave.

8. An apparatus according to claim 4, wherein the exit opening of the nozzle passage in a cylindrical development has the form of two waves.

9. An apparatus according to claim 3, wherein the end wall of the jacket of the nozzle and the end wall of the mandrel facing the end wall of the jacket form a substantially radially, outwardly-opening exit region of the nozzle passage.

10. An apparatus according to claim 9, wherein the nozzle passage extends in trumpet shape towards the nozzle mouth.

11. An apparatus according to claim 4, wherein the distance from the portion closest to the extruder of the extruder-side edge of the nozzle opening up to the portion most remote from the extruder of said edge thereof corresponds to one pitch (t) or to an integer multiple of one pitch of the ribs of the tube.

12. An apparatus according to claim 4 in which the piston which has an inclined rising extruder-side end wall is arranged at a considerable distance from the extrusion nozzle, the opening of which is rotational-symmetrical with respect to the nozzle axis, wherein the extruder-side end wall of the mandrel in the peripheral region of delayed filling has a greater distance from the nozzle opening than the remaining peripheral region.

13. An apparatus according to claim 4, wherein the end wall of the jacket of the nozzle and the end wall of the mandrel facing the end wall of the jacket form a substantially radially, outwardly-opening exit region of the nozzle passage.

14. An apparatus according to claim 4, wherein the nozzle passage extends in trumpet shape towards the nozzle mouth.

* * * * *

UNITED STATES PATENT AND TRADEMARK OFFICE
CERTIFICATE OF CORRECTION

PATENT NO. : 4,983,347
DATED : January 8, 1991
INVENTOR(S) : Horst RAHN

It is certified that error appears in the above-identified patent and that said Letters Patent is hereby corrected as shown below:

Title Page [30] - "Oct. 21, 1988" should be -- Nov. 5, 1987 --.

Column 8, Claim 1, Line 68, "filing" should be -- filling --.

Column 10, Claim 9, Line 13, "3" should be -- 4 --.

Column 10, Claim 9, Line 13, "the" should be -- an --.

Column 10, Claim 9, Line 14, "the" (before "jacket") should be -- a --.

Signed and Sealed this

Twenty-first Day of July, 1992

Attest:

DOUGLAS B. COMER

*Attesting Officer*     Acting Commissioner of Patents and Trademarks